United States Patent
Yan et al.

(10) Patent No.: US 11,632,057 B2
(45) Date of Patent: Apr. 18, 2023

(54) THREE-PHASE CONVERTER AND CONTROL METHOD THEREOF

(71) Applicant: Delta Electronics (Shanghai) Co., Ltd., Shanghai (CN)

(72) Inventors: Chao Yan, Shanghai (CN); Tao Xia, Shanghai (CN); Kailiang Zhan, Shanghai (CN); Xinwei Liu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/524,231

(22) Filed: Nov. 11, 2021

(65) Prior Publication Data
US 2022/0216802 A1    Jul. 7, 2022

(30) Foreign Application Priority Data
Jan. 4, 2021    (CN) .......................... 202110002553.0

(51) Int. Cl.
*H02M 1/12* (2006.01)
*H02M 7/217* (2006.01)
(Continued)

(52) U.S. Cl.
CPC ........... *H02M 7/219* (2013.01); *H02M 1/126* (2013.01); *H02M 1/44* (2013.01); *H02M 7/2173* (2013.01); *H02M 7/21* (2013.01); *H02M 7/217* (2013.01)

(58) Field of Classification Search
CPC ........ H02M 1/126; H02M 7/21; H02M 7/217; H02M 7/2173
See application file for complete search history.

(56) References Cited

U.S. PATENT DOCUMENTS 8,174,853 B2 * 5/2012 Kane ..................... H02M 1/126
                                                            363/40
9,590,494 B1    3/2017 Zhou et al.
(Continued)

FOREIGN PATENT DOCUMENTS

CN        105553306 A    5/2016
CN        106961225 B    6/2019
(Continued)

OTHER PUBLICATIONS

Michael Haider et al., Novel ZVS S-TCM Modulation of Three-Phase DC Converters, Open Journal of Power Electronics, Nov. 24, 2020, pp. 529-543.
(Continued)

*Primary Examiner* — Gary A Nash
(74) *Attorney, Agent, or Firm* — Kirton McConkie; Evan R. Witt

(57) ABSTRACT

A three-phase converter and a control method thereof are provided. The three-phase converter includes an AC terminal, three filter circuits, three bridge arm circuits, a capacitor module and a DC terminal connected in sequence and a controller. The midpoints of the filter circuits are connected to the midpoint of the capacitor module. The controller controls each bridge arm circuit to work in the first and second modes at different time in one line voltage cycle of the AC source. In the first mode, the bridge arm circuit works in a clamping state. In the second mode, the bridge arm circuit selectively works in a DCM mode or a TCM mode. A switching frequency is limited to be lower than a preset frequency. When the three-phase converter works with over 80% of a rated load, a time length of working in the second mode is $\frac{1}{3} \sim \frac{2}{3}$ of the line voltage cycle.

20 Claims, 12 Drawing Sheets

(51) Int. Cl.
   *H02M 7/21*   (2006.01)
   *H02M 7/219*  (2006.01)
   *H02M 1/44*   (2007.01)

(56) References Cited

U.S. PATENT DOCUMENTS

| | | | |
|---|---|---|---|
| 10,291,109 B2 | 5/2019 | Huang et al. | |
| 10,381,921 B1 | 8/2019 | Haryani et al. | |
| 2013/0235626 A1* | 9/2013 | Jang | H02M 5/4585 363/37 |
| 2014/0140112 A1* | 5/2014 | Zhou | H02M 1/126 363/39 |
| 2014/0268933 A1* | 9/2014 | Zhou | H02M 1/12 363/44 |
| 2019/0013671 A1* | 1/2019 | Sodo | H02M 5/4585 |
| 2019/0028039 A1* | 1/2019 | Sodo | H02M 1/126 |
| 2019/0229646 A1 | 7/2019 | Liu et al. | |
| 2019/0280609 A1 | 9/2019 | Liu et al. | |

FOREIGN PATENT DOCUMENTS

| | | |
|---|---|---|
| CN | 108123639 B | 2/2020 |
| CN | 111837321 A | 10/2020 |
| DE | 112018007312 T5 | 12/2020 |
| JP | 2019530418 A | 10/2019 |
| TW | 201338389 A | 9/2013 |
| TW | 202007064 A | 2/2020 |

OTHER PUBLICATIONS

Zhengrong Huang et al., Critical-Mode-Based Soft-Switching Modulation for Three-Phase Rectifiers, IEEE, 2018, pp. 16-23.
Teng Liu, GaN-Based Megahertz Single-Phase Inverter With a Hybrid TCM Control Method for High Efficiency and High-Power Density, IEEE, Jun. 2021, pp. 6797-6813.
N. Haryani, B. Sun and R. Burgos, "ZVS Turn-on Triangular Current Mode (TCM) Control for Three Phase 2-Level Inverters with Reactive Power Control," 2018 IEEE Energy Conversion Congress and Exposition (ECCE), 2018, pp. 4940-4947.

* cited by examiner

THREE-PHASE CONVERTER AND CONTROL METHOD THEREOF

CROSS-REFERENCE TO RELATED APPLICATION

This application claims priority to China Patent Application No. 202110002553.0, filed on Jan. 4, 2021, the entire contents of which are incorporated herein by reference for all purposes.

FIELD OF THE INVENTION

The present disclosure relates to a three-phase converter and a control method thereof, and more particularly to a three-phase converter and a control method thereof capable of realizing the three-phase decoupling control, optimizing the electromagnetic compatibility, and having low switching loss.

BACKGROUND OF THE INVENTION

Three-phase converter is one of the most widely used converter topologies. Many kinds of control and modulation schemes have been developed for the three-phase converter, such as the common continuous modulation scheme like SPWM (sinusoidal PWM) and the third harmonic injection SVPWM (space vector PWM), the discontinuous modulation scheme like DPWM (discontinues PWM), and the variable frequency modulation scheme for achieving soft switching.

In substance, the conventional modulation schemes may be divided into hard-switching modulation schemes and soft-switching modulation schemes. Due to the limitation of switching loss, it is difficult for the hard-switching modulation scheme to achieve high frequency, high power density and high efficiency at the same time. With regard to the soft-switching modulation scheme, the range of switching frequency is usually too wide, and it is difficult to analyze and design because of three-phase coupling.

Therefore, there is a need of providing a three-phase converter and a control method thereof in order to overcome the drawbacks of the conventional technologies.

SUMMARY OF THE INVENTION

In accordance with an aspect of the present disclosure, a three-phase converter is provided. The three-phase converter includes an AC terminal, a DC terminal, three bridge arm circuits, three filter circuits, a capacitor module and a controller. The AC terminal is electrically coupled to an AC source. The DC terminal is electrically coupled to a DC source or a DC load. The three bridge arm circuits form a three-phase bridge arm circuit collaboratively and are electrically connected to the DC terminal. Each of the three bridge arm circuits has a bridge arm midpoint. The three filter circuits form a three-phase filter circuit collaboratively. The three-phase filter circuit is electrically connected between the three-phase bridge arm circuit and the AC terminal. The three filter circuits are electrically connected to the bridge arm midpoints of the three bridge arm circuits respectively. Each of the three filter circuits includes a filtering inductor and a filtering capacitor. The filtering inductor is electrically connected between the AC terminal and the corresponding bridge arm midpoint. A first terminal of the filtering capacitor is electrically connected between the AC terminal and the corresponding filtering inductor. Three second terminals of the three filtering capacitors are electrically connected with each other to form a filtering capacitor midpoint. The capacitor module is electrically connected to two terminals of the three-phase bridge arm circuit in parallel and includes two capacitors and a DC capacitor midpoint. The DC capacitor midpoint is located between the two capacitors and is electrically coupled to the filtering capacitor midpoint. The controller is used for controlling each of the three bridge arm circuits to work at least in a first mode and a second mode at different time in a single line voltage cycle of the AC source. In the first mode, the bridge arm circuit works in a clamping state. In the second mode, the bridge arm circuit selectively works in a DCM mode or a TCM mode. A switching frequency of the three-phase converter is limited to be lower than a preset frequency. When the three-phase converter works with over 80% of a rated load, a time length of the bridge arm circuit working in the second mode is $1/3 \sim 2/3$ of the line voltage cycle.

In accordance with another aspect of the present disclosure, a control method configured to control the three-phase converter of the present disclosure is provided. The control method includes controlling each of the three bridge arm circuits to work at least in a first mode and a second mode at different time in a single line voltage cycle of the AC source. In the first mode, the bridge arm circuit is controlled to work in a clamping state. In the second mode, the bridge arm circuit is controlled to selectively work in a DCM mode or a TCM mode. Accordingly, a switching frequency of the three-phase converter is limited to be lower than a preset frequency. When the three-phase converter works with over 80% of a rated load, a time length of the bridge arm circuit working in the second mode is $1/3 \sim 2/3$ of the line voltage cycle.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
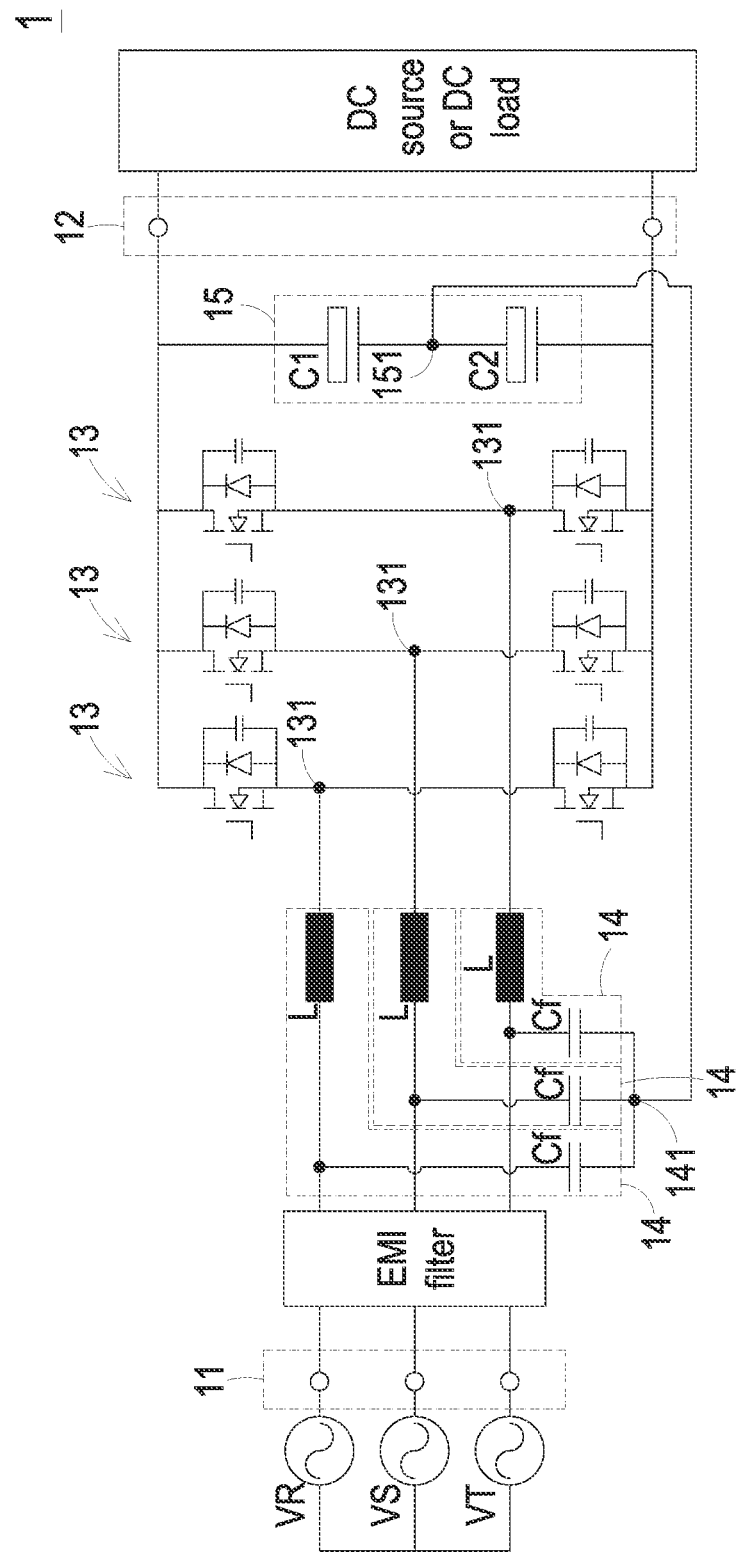
FIG. 1 is a schematic circuit diagram illustrating a three-phase converter according to an embodiment of the present disclosure.

FIG. 1 is a schematic circuit diagram illustrating a three-phase converter according to an embodiment of the present disclosure. As shown in FIG. 1, the three-phase converter 1 includes an AC terminal 11, a DC terminal 12, three bridge arm circuits 13, three filter circuits 14, a capacitor module 15 and a controller (not shown). The AC terminal 11 is electrically coupled to AC sources VR, VS and VT. The DC terminal 12 is electrically coupled to a DC source or a DC load. The three bridge arm circuits 13 form a three-phase bridge arm circuit collaboratively. Each bridge arm circuit 13 is electrically connected to the DC terminal 12 and has a bridge arm midpoint 131. The three filter circuits 14 form a three-phase filter circuit collaboratively, and the three-phase filter circuit is electrically coupled between the three-phase bridge arm circuit and the AC terminal 11. The three filter circuits 14 are electrically connected to three bridge arm midpoints 131 of the three bridge arm circuits 13 respectively. Each filter circuit 14 includes a filtering inductor L and a filtering capacitor Cf. In each filter circuit 14, the filtering inductor L is electrically connected between the AC terminal 11 and the corresponding bridge arm midpoint 131, and a first terminal of the filtering capacitor Cf is electrically connected between the AC terminal 11 and the filtering inductor L. Three second terminals of the three filtering capacitors Cf of the three filter circuits 14 are connected with each other to form a filtering capacitor midpoint 141. The capacitor module 15 is connected to two terminals of the three-phase bridge arm circuit in parallel, and the capacitor module 15 includes two capacitors C1 and C2 and a DC capacitor midpoint 151. The DC capacitor midpoint 151 is located between the two capacitors C1 and C2, and the DC capacitor midpoint 151 is electrically coupled to the filtering capacitor midpoint 141. The controller is configured to control the transistors of the three-phase bridge arm circuit to turn on or turn off. Since the filtering capacitor midpoint 141 is electrically connected to the DC capacitor midpoint 151, the controls for the bridge arm circuits of three phases respectively are decoupled from each other, which is beneficial for circuit analysis and design. In an embodiment, the three-phase converter 1 further includes an EMI (electromagnetic interference) filter coupled between the AC terminal 11 and the three-phase filter circuit. Since the filtering capacitor midpoint 141 is connected to the DC capacitor midpoint 151, an internal circuit loop for common mode component is provided to reduce the pressure on the EMI filter.

The filter circuit 14 may be an LCL structure, but not limited thereto. The transistors of the bridge arm circuit 13 are MOSFETs in this embodiment, but not limited thereto. The transistors of the bridge arm circuit 13 may be IGBTs or other type of transistors in some embodiments.

In this embodiment, the filtering capacitor midpoint 141 is directly connected to the DC capacitor midpoint 151 through wires, but not limited thereto. In another embodiment, there may be the electronic component(s) serially connected between the filtering capacitor midpoint 141 and the DC capacitor midpoint 151.

Figure 2:
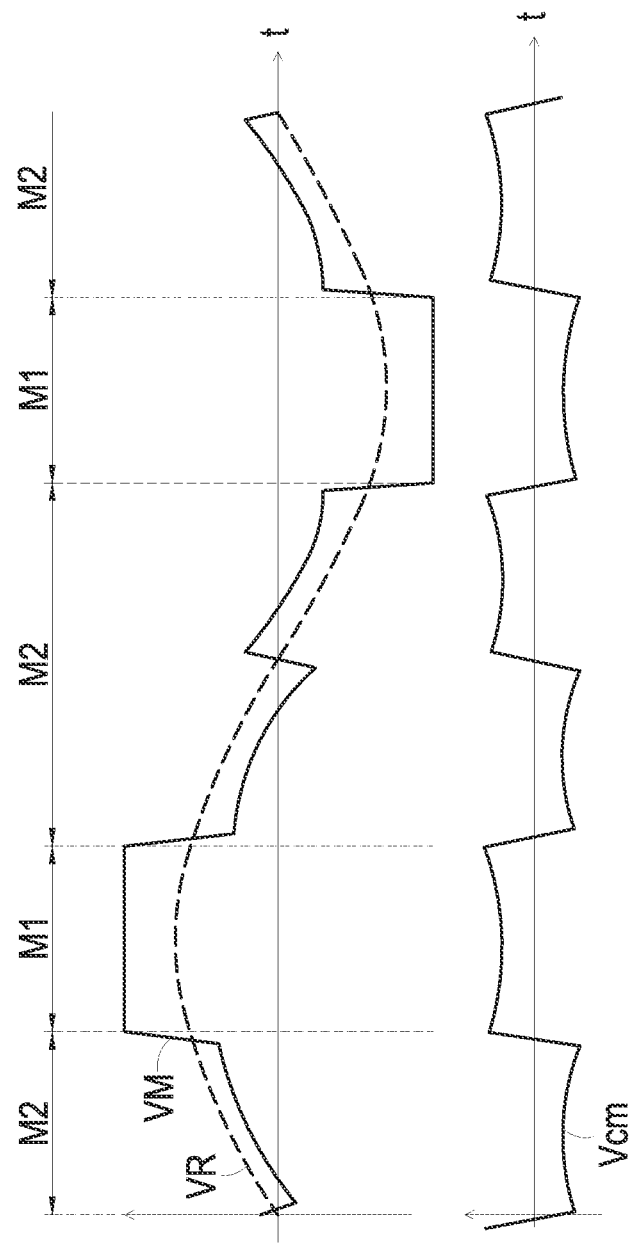
FIG. 2 is a schematic oscillogram illustrating the modulation waves of the three-phase converter of FIG. 1.

As shown in FIG. 2, in a single line voltage cycle of the AC sources VR, VS and VT (the AC source VR is taken as an example shown in FIG. 2), the controller controls each bridge arm circuit 13 to work at least in a first mode M1 and a second mode M2 at different time. In the first mode M1, the bridge arm circuit 13 works in the clamping state. In the second mode M2, the bridge arm circuit 13 selectively works in the DCM mode or the TCM mode so that the transistors of the bridge arm circuit 13 can realize zero-voltage switching or valley switching. Consequently, the switching frequency fs of the three-phase converter 1 is limited to be lower than the preset frequency fmax. In an embodiment, when the three-phase converter 1 works with over 80% of the rated load, the time length of the bridge arm circuit 13 working in the second mode M2 is ⅓~⅔ of the line voltage cycle (i.e., 50%~100% of ⅔ of the line voltage cycle). In an embodiment, the time length of the bridge arm circuit 13 working in the second mode M2 is at least 50%, 75%, 80% or 90% of ⅔ of the line voltage cycle.

In a single line voltage cycle of the AC source, the bridge arm circuit 13 not only works in the first mode M1 and the second mode M2 but also works in a third mode M3, such as CCM (continuous conduction modulation) mode. As for work time sequence, the third mode M3 may be between the first mode M1 and the second mode M2 (e.g., the bridge arm circuit 13 may work with a time sequence of M1-M3-M2-M3-M1). Alternatively, the third mode M3 may be inserted in the second mode M2 (e.g., the bridge arm circuit 13 may work with a time sequence of M1-M2-M3-M2-M1). The time length of the bridge arm circuit 13 working in different mode is relative to the load. When the load is lighter, the time length of the bridge arm circuit 13 working in the second mode M2 can be longer. When the load is heavier (e.g., over 50% or 80% of the rated load), the time length of the bridge arm circuit 13 working in the second mode M2 may be 50%, 75%, 80%, 90% or more of ⅔ of the line voltage cycle.

In some embodiments, the three-phase converter 1 adopts DPWM scheme. Specifically, as shown in FIG. 2, the controller superposes a three-phase initial modulation wave of the three-phase bridge arm circuit on a three-phase common mode modulation wave to generate a three-phase modulation wave corresponding to the three-phase bridge arm circuit. There is no vertical jump in the waveform of the three-phase common mode modulation wave. Namely, when the three-phase common-mode modulation wave transits from positive to negative or transits from negative to positive, the slope is not infinite. The slope may be a variable slope or a specific slope which is preset according to actual requirements. Alternatively, the slope may change in real time. The specific value of the slope is not limited in the present disclosure. Consequently, since the three-phase modulation wave has a slope, the switching loss is reduced, and the common mode current is suppressed in the meantime. As shown in FIG. 2, taking the AC source VR as an example, the controller superposes the initial modulation wave (i.e., the AC source VR) on the common mode modulation wave Vcm to generate the modulation wave VM of the corresponding bridge arm circuit 13.

In an embodiment, in the first mode M1, the clamping state includes a positive clamping state and a negative clamping state. The bridge arm circuit 13 works in the positive clamping state when the corresponding modulation wave reaches a positive limit value. The bridge arm circuit 13 works in the negative clamping state when the corresponding modulation wave reaches a negative limit value. The time length of the bridge arm circuit 13 working in the first mode M1 can fluctuate above and below ⅓ of the line voltage cycle, and the said time length is depended on the specific implementation of DPWM and the slope of the common mode modulation wave Vcm. In an embodiment, preferably but not exclusively, the time length of the bridge arm circuit 13 working in the positive clamping state is equal to the time length of the bridge arm circuit 13 working in the negative clamping state. That is, the positive and negative clamping states share the time length of the bridge arm circuit 13 working in the first mode M1 equally.

Figure 3:
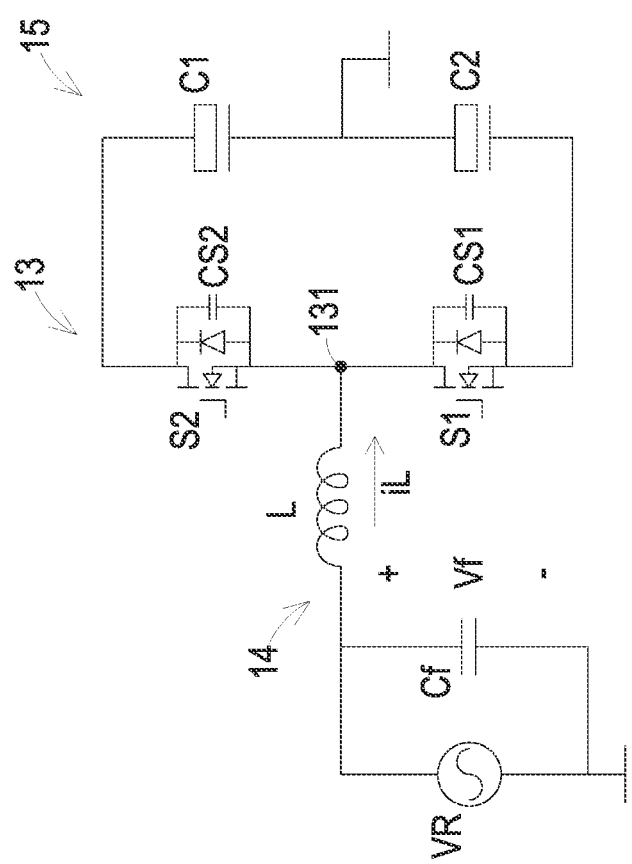
FIG. 3 is a schematic circuit diagram illustrating the bridge arm circuit of FIG. 1.

FIG. 3 shows the circuitry structure of one bridge arm circuit according to an embodiment of the present disclosure for analysis. In the three-phase converter 1 of the present disclosure, the circuits of different phases have the same circuitry structure. Therefore, FIG. 3 only shows the AC source VR and the corresponding bridge arm circuit 13 and filter circuit 14 for illustration. As shown in FIG. 3, the bridge arm circuit 13 includes a main transistor S1 and an auxiliary transistor S2 electrically coupled in series. The main transistor S1 and the auxiliary transistor S2 are not in an on state at the same time. In addition, the bridge arm circuit 13 further includes a main capacitor CS1 and an auxiliary capacitor CS2. The main capacitor CS1 is coupled to the main transistor S1 in parallel, and the auxiliary capacitor CS2 is coupled to the auxiliary transistor S2 in parallel. The main capacitor CS1 and the auxiliary capacitor CS2 can be the junction capacitors of the main transistor S1 and the auxiliary transistor S2 respectively, or can be the additional capacitors connected to two terminals of the corresponding transistor, but not limited thereto.

When the sum of the time length of the main transistor S1 being in the on state and the time length of the auxiliary transistor S2 being in the on state is greater than or equal to the preset period Tmin corresponding to the preset frequency fmax, the bridge arm circuit 13 works in the DCM mode or the TCM mode. Under this circumstance, if the bridge arm circuit 13 works in the TCM mode, it is beneficial for realizing soft switching. Alternatively, if the bridge arm circuit 13 works in the DCM mode, it is beneficial for further reducing the switching frequency, but a part of the conducting loss may be slightly increased. When the sum of the time length of the main transistor S1 being in the on state and the time length of the auxiliary transistor S2 being in the on state is less than the preset period Tmin, the bridge arm circuit 13 works in the DCM mode.

Accordingly, when the bridge arm circuit 13 is in the second mode M2, the controller can control the bridge arm circuit 13 to work in the TCM mode or the DCM mode. Furthermore, the DCM mode includes a first DCM mode, a second DCM mode and a third DCM mode. As shown in FIG. 3, the polarity of the filtering voltage Vf is positive if the filtering voltage Vf on the filtering capacitor Cf is positive above and negative below. On the contrary, the polarity of the filtering voltage Vf is negative if the filtering voltage Vf is negative above and positive below. In addition, if the inductor current iL on the filtering inductor L flows into the bridge arm midpoint 131, the polarity of the inductor current iL is positive. On the contrary, if the inductor current iL on the filtering inductor L flows out from the bridge arm midpoint 131, the polarity of the inductor current iL is negative. In each bridge arm circuit 13 and the corresponding filter circuit 14, when the product of the filtering voltage Vf on the filtering capacitor Cf and an average value of the inductor current iL on the filtering inductor L is positive, the bridge arm circuit 13 works in the first DCM mode or the third DCM mode. When the product of the filtering voltage Vf and the average value of the inductor current iL is negative, the bridge arm circuit 13 works in the second DCM mode. The operations of the bridge arm circuit 13 working in the TCM mode, the first DCM mode, the second DCM mode and the third DCM mode are exemplified as follows according to FIG. 4A, FIG. 4B, FIG. 4C, and FIG. 4D respectively. In these figures, VGS1 is the driving voltage of the main transistor S1 (i.e., the gate-source voltage on the main transistor S1), VGS2 is the driving voltage of the auxiliary transistor S2 (i.e., the gate-source voltage on the auxiliary transistor S2), and VDS1 is the voltage on the main capacitor CS1.

Figure 4A:
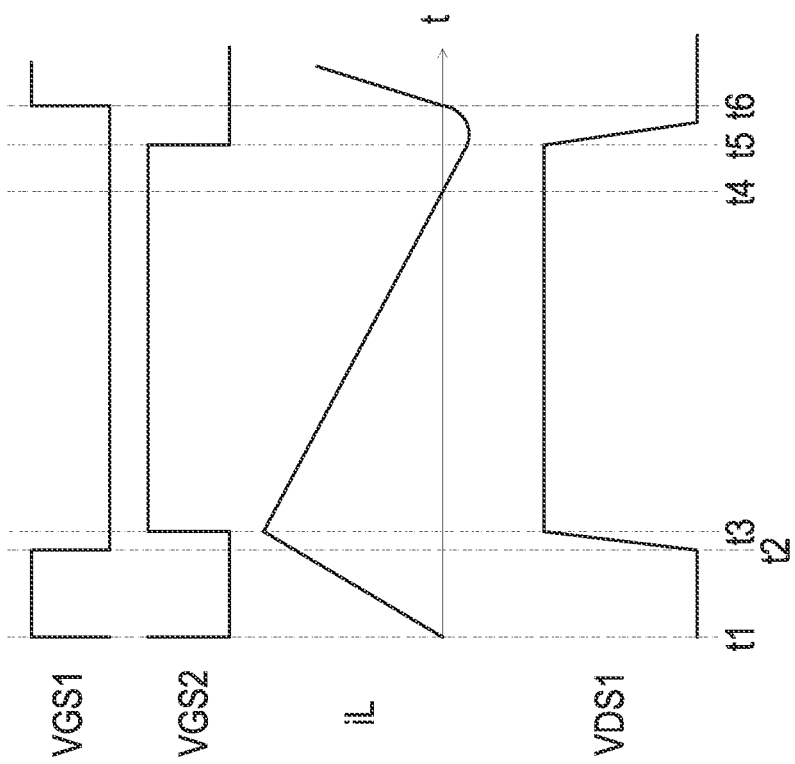
FIG. 4A is a schematic oscillogram illustrating the waveforms of the bridge arm circuit of FIG. 3 working in the TCM mode.

As shown in FIG. 4A, the bridge arm circuit 13 works in the TCM mode. At time t1, the main transistor S1 is turned on, and the auxiliary transistor S2 is turned off. During the period from time t1 to time t2, the main transistor S1 is in the on state, and the inductor current iL on the filtering inductor L of the corresponding filter circuit 14 increases. At time t2, the main transistor S1 is turned off. The period from time t2 to time t3 is the dead time. At time t3, the auxiliary transistor S2 is turned on, and the main transistor S1 is maintained in the off state. During the period from time t3 to time t5, the auxiliary transistor S2 is in the on state, and the inductor current iL decreases. The inductor current iL decreases to zero at time t4, and then the auxiliary transistor S2 is still maintained in the on state until time t5 so as to make the inductor current iL negative. At time t5, the inductor current iL decreases to a negative preset current value, and the auxiliary transistor S2 is turned off. After time t5, the voltage VDS1 on the main capacitor CS1 is discharged by the negative inductor current iL and decreases. When the voltage VDS1 on the main capacitor CS1 decreases to a preset voltage (e.g., the voltage of 0V at time t6), the main transistor S1 is turned on. The preset voltage may be a voltage value close to zero, thereby achieving the zero-voltage switching of the main transistor S1.

Figure 4B:
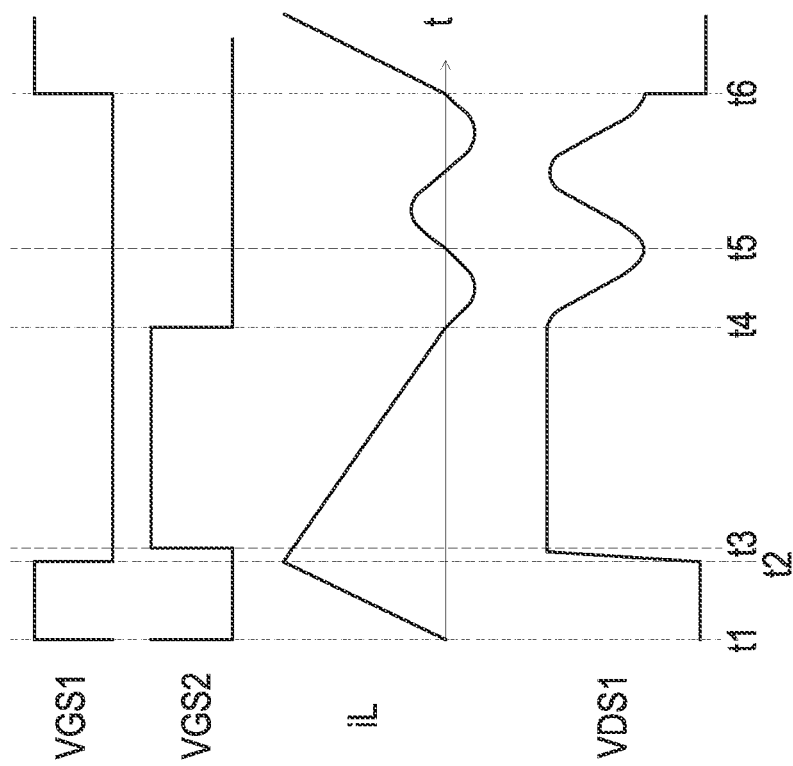
FIG. 4B is a schematic oscillogram illustrating the waveforms of the bridge arm circuit of FIG. 3 working in the first DCM mode.

As shown in FIG. 4B, the bridge arm circuit 13 works in the first DCM mode. At time t1, the main transistor S1 is turned on, and the auxiliary transistor S2 is turned off. During the period from time t1 to time t2, the main transistor S1 is in the on state, and the inductor current iL on the filtering inductor L of the corresponding filter circuit 14 increases. At time t2, the main transistor S1 is turned off. The period from time t2 to time t3 is the dead time. At time t3, the auxiliary transistor S2 is turned on. During the period from time t3 to time t4, the auxiliary transistor S2 is in the on state, and the inductor current iL decreases. At time t4, the inductor current iL decreases to zero, and the auxiliary transistor S2 is turned off. During the period from time t4 to time t6, both the main transistor S1 and the auxiliary transistor S2 are in the off state, and the filtering inductor L, the main capacitor CS1 and the auxiliary capacitor CS2 resonates with each other. The main transistor S1 is turned on when the voltage VDS1 on the main capacitor CS1 resonates to the n-th valley value, where n is a positive integer. In this embodiment, n equals 2, that is, the main transistor S1 is turned on when the voltage VDS1 on the main capacitor CS1 resonates to the second valley value. In fact, the value of n is determined by the relation between the switching frequency fs and the preset frequency fmax. The larger n is, the longer the resonance time is. Further, the switching frequency fs decreases with the extension of the resonance time. Consequently, the switching frequency fs can be effectively controlled so as to reduce switching loss.

Moreover, the main transistor S1 is turned on at the voltage valley value, and the turning-on loss is small.

Figure 4C:
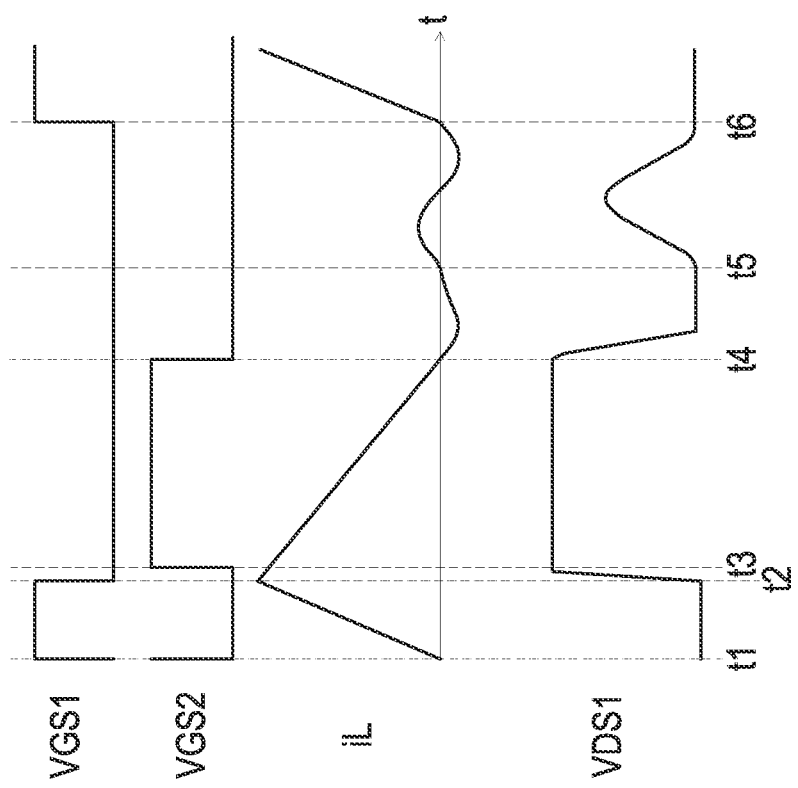
FIG. 4C is a schematic oscillogram illustrating the waveforms of the bridge arm circuit of FIG. 3 working in the second DCM mode.

As shown in FIG. 4C, the bridge arm circuit 13 works in the second DCM mode, the corresponding operation of the second DCM mode is similar to that of the first DCM mode, and thus the detailed descriptions of the operation of the second DCM mode are omitted herein. In comparison with the first DCM mode, the valley value of the voltage VDS1 on the main capacitor CS1 during resonance time equals zero when the bridge arm circuit 13 works in the second DCM mode. Consequently, the zero-voltage switching of the main transistor S1 is achieved, and the turning-on loss is almost zero.

Figure 4D:
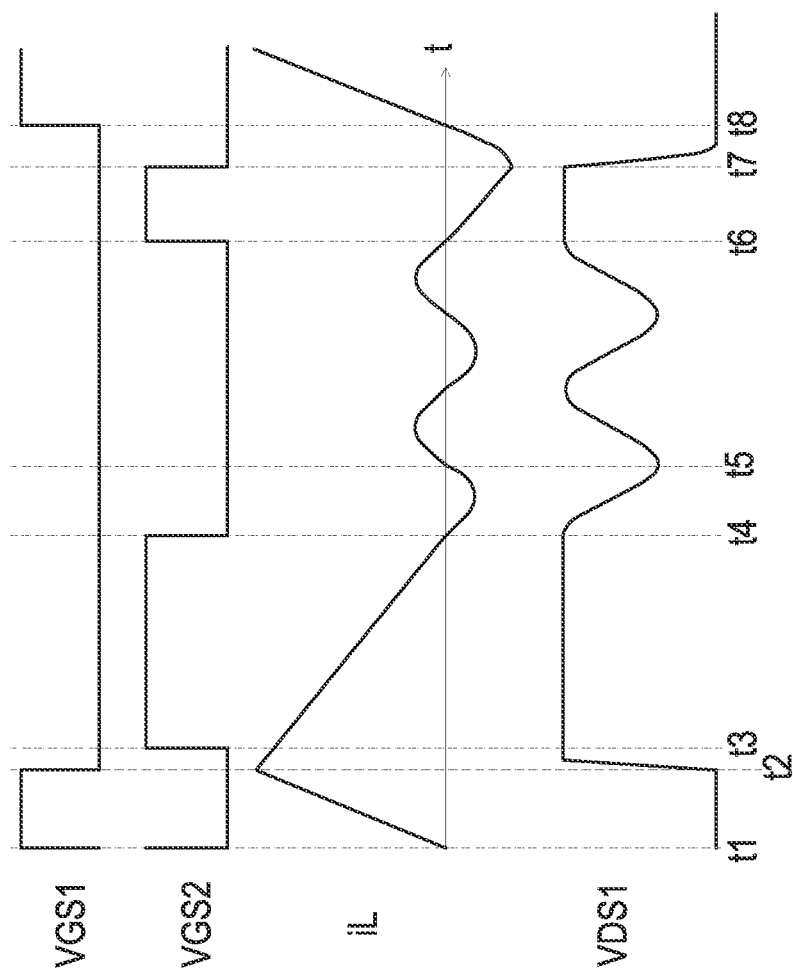
FIG. 4D is a schematic oscillogram illustrating the waveforms of the bridge arm circuit of FIG. 3 working in the third DCM mode.

As shown in FIG. 4D, the bridge arm circuit 13 works in the third DCM mode. In comparison with the first DCM mode, the third DCM mode can further reduce the turning-on loss. At time t1, the main transistor S1 is turned on, and the auxiliary transistor S2 is turned off. During the period from time t1 to time t2, the main transistor S1 is in the on state, and the inductor current iL on the filtering inductor L of the corresponding filter circuit 14 increases. At time t2, the main transistor S1 is turned off. The period from time t2 to time t3 is the dead time. At time t3, the auxiliary transistor S2 is turned on. During the period from time t3 to time t4, the auxiliary transistor S2 is in the on state, and the inductor current iL decreases. At time t4, the inductor current iL decreases to zero, and the auxiliary transistor S2 is turned off. During the period from time t4 to time t6, both the main transistor S1 and the auxiliary transistor S2 are in the off state, and the filtering inductor L, the main capacitor CS1 and the auxiliary capacitor CS2 resonates with each other. When the voltage VDS1 on the main capacitor CS1 resonates to the m-th peak value (correspondingly, the voltage VDS2 on the auxiliary capacitor CS2 resonates to the m-th valley value), the auxiliary transistor S2 is turned on, where m is a positive integer. Afterward, the auxiliary transistor S2 is in the on state for a preset time (e.g., the time length from time t6 to time t7). In this embodiment, m equals 3, that is, the auxiliary transistor S2 is turned on when the voltage VDS1 on the main capacitor CS1 resonates to the third peak value. In fact, the value of m is determined by the relation between the switching frequency fs and the preset frequency fmax. The larger m is, the longer the resonance time is. Further, the switching frequency fs decreases with the extension of the resonance time. Consequently, the switching frequency fs can be effectively controlled. During the time period from time t6 to time t7, the auxiliary transistor S2 is in the on state, and the inductor current iL decreases to a negative preset current value gradually. At time t7, the auxiliary transistor S2 is turned off. After time t7, the voltage VDS1 on the main capacitor CS1 is discharged by the negative inductor current iL and decreases. When the voltage VDS1 on the main capacitor CS1 decreases to a preset voltage (e.g., the voltage of 0V at time t8), the main transistor S1 is turned on. Consequently, the zero-voltage switching of the main transistor S1 is achieved, and the turning-on loss is almost zero.

It is understood that the switching time sequences of the main transistor S1 and the auxiliary transistor S2 may be exchanged with each other, and the zero-voltage switching or the valley switching of the auxiliary transistor S2 can be achieved accordingly.

Therefore, through controlling the bridge arm circuit 13 to work in the TCM mode or various DCM modes selectively, the variation of the switching frequency fs can be limited within a small range, thereby making the three-phase converter 1 have higher practical value. Meanwhile, the soft switching or valley switching is achieved, thereby decreasing the switching loss and further improving the efficiency of the converter.

Figure 5:
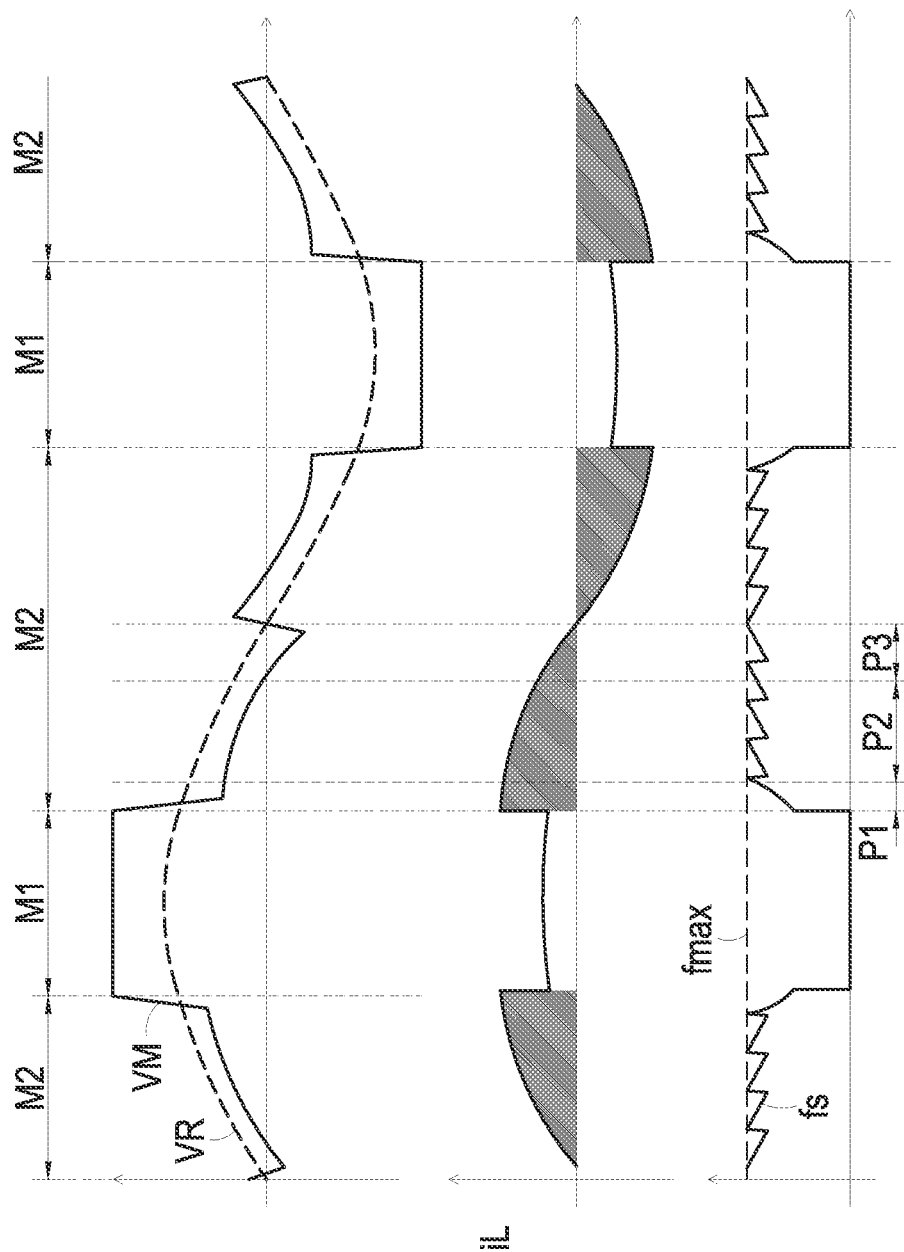
FIG. 5 is a schematic oscillogram illustrating the waveforms of the three-phase converter according to an embodiment of the present disclosure.

An implementation of controlling the bridge arm circuit 13 is exemplified in FIG. 5. The following description is focused on the operating state during the time periods P1, P2 and P3, the control for the other time periods can be derived accordingly, and thus the detailed descriptions thereof are omitted herein. In addition, an envelope of the inductor current iL is shown in FIG. 5. As shown in FIG. 5, during the time period P1, the switching frequency fs is smaller than the preset frequency fmax, and the bridge arm circuit 13 is controlled to work in the TCM mode since the difference between the switching frequency fs and the preset frequency fmax is large. During the time period P2, since the inductor current iL decreases, the switching frequency fs approaches or may even be higher than the preset frequency fmax if the bridge arm circuit 13 continues to work in the TCM mode. Meanwhile, since the product of the filtering voltage Vf on the filtering capacitor Cf and the average value of the inductor current iL on the filtering inductor L is positive, the bridge arm circuit 13 can be controlled to work in the first DCM mode. In the first DCM mode, the switching frequency fs can be controlled by controlling the number of resonance cycles. During the time period P3, the inductor current iL continues to decrease, and the product of the filtering voltage Vf and the average value of the inductor current iL is negative. Therefore, the bridge arm circuit 13 can be controlled to work in the second DCM mode.

In an embodiment, during the time period P1, the bridge arm circuit 13 can also be controlled to work in the first DCM mode or the third DCM mode. In another embodiment, during the time period P2, the bridge arm circuit 13 can also be controlled to work in the third DCM mode.

Figure 6:
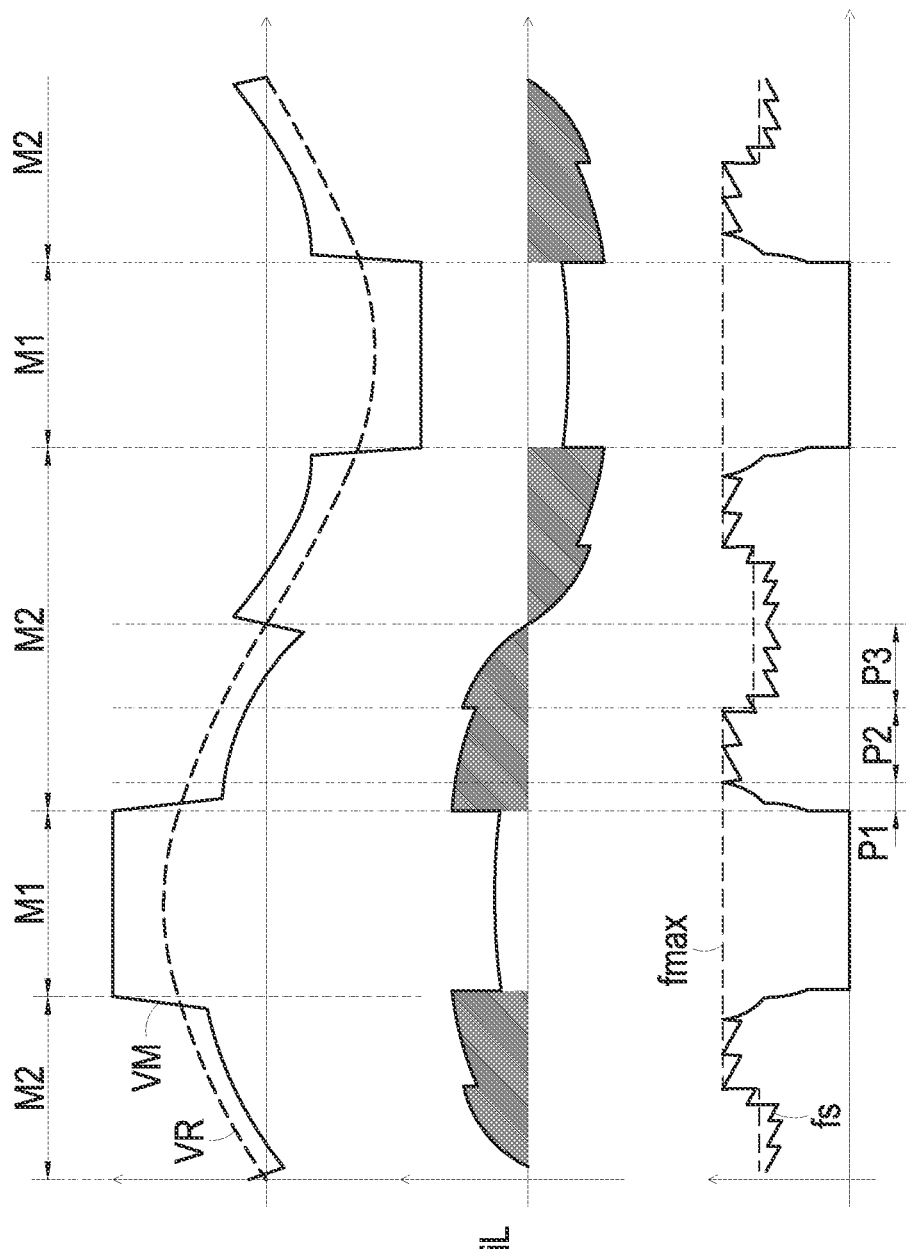
FIG. 6 is a schematic oscillogram illustrating the waveforms of the three-phase converter according to another embodiment of the present disclosure.

In an embodiment, as shown in FIG. 6, when the absolute value of the average value of the inductor current iL is smaller than a preset threshold, the preset frequency fmax may be reduced correspondingly, thereby reducing the switching loss and improving the efficiency. It is noted that the preset frequency fmax of the present disclosure may be a constant value or a value that changes stepwise or linearly with the average value of the inductor current iL, but not limited thereto.

Figure 7:
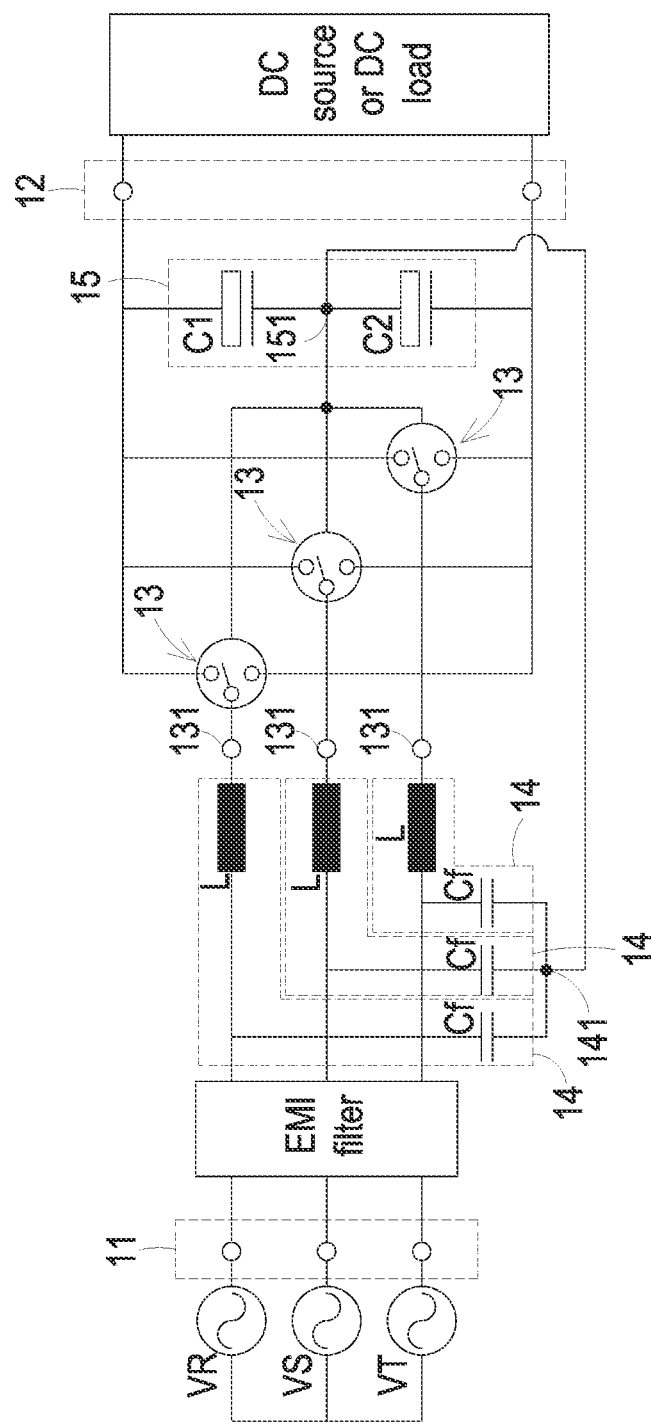
FIG. 7, FIG. 8 and FIG. 9 are schematic circuit diagrams showing the various variants of the three-phase converter of FIG. 1.

In addition, the three-phase converter shown in FIG. 1 is a three-phase two-level converter, but the practical implementation of the three-phase converter of the present disclosure is not limited thereto. In an embodiment, as shown in FIG. 7, the three-phase converter is a three-phase three-level converter 1a. In this embodiment, the circuitry structure of the three-level converter is shown by a schematic circuit diagram. The schematic circuit diagram of FIG. 7 may represent all kinds of midpoint-clamped three-level converter, such as three-level ANPC (active neutral point clamped) converter, three-level DNPC (diode neutral point clamped) converter, three-level TNPC (T-type neutral point clamped) converter, or flying capacitor three-level converter, but not limited thereto.

Figure 8:
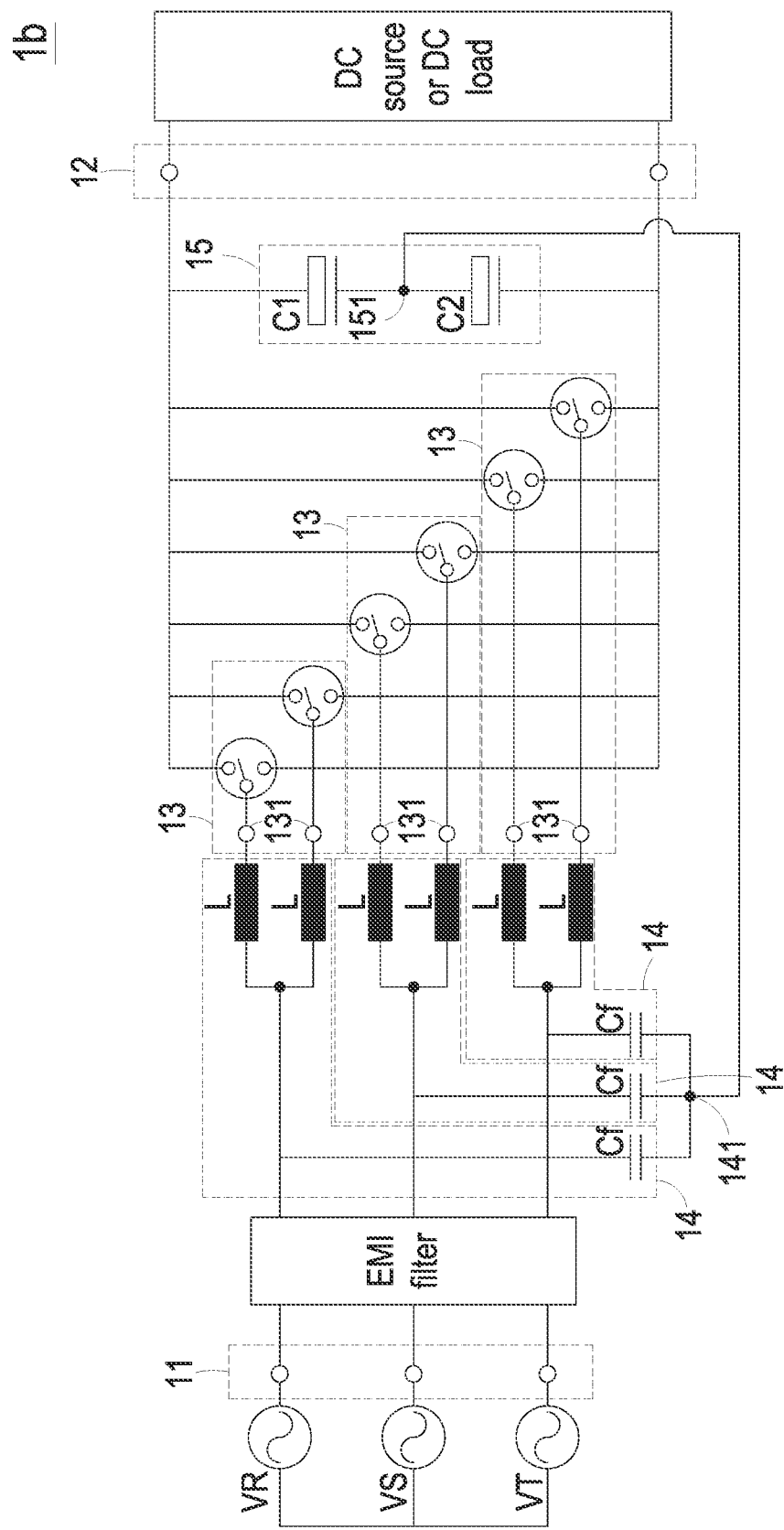
Figure 9:
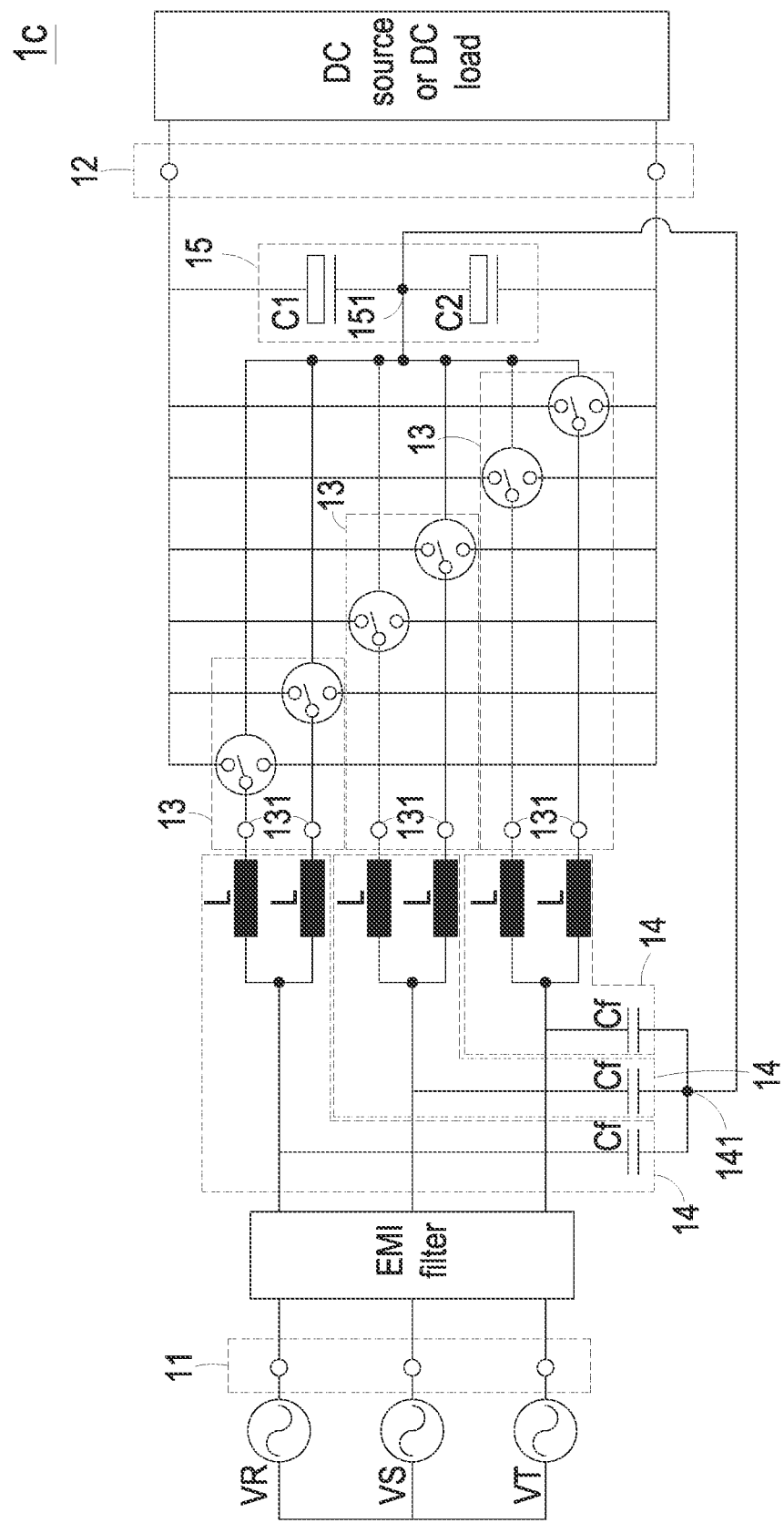

Moreover, in an embodiment, the interleaving and parallel connecting technique may be utilized to obtain larger power, reduce the current ripple flowing into the filtering capacitor Cf and the capacitors C1 and C2, and reduce the pressure on the EMI filter. FIG. 8 and FIG. 9 respectively show a three-phase double interleaving two-level converter 1b and a three-phase double interleaving three-level converter 1c. As shown in FIG. 8, in each bridge arm circuit 13 and the corresponding filter circuit 14, the bridge arm circuit 13 includes a plurality of bridge arms coupled in parallel, each bridge arm has one bridge arm midpoint 131, and the filter circuit 14 includes a plurality of filtering inductors L. The plurality of filtering inductors L are corresponding to the plurality of bridge arms one-to-one, and each filtering inductor L is electrically connected between the AC terminal 11 and the bridge arm midpoint 131 of the corresponding bridge arm. In the embodiment shown in FIG. 8, each bridge arm circuit 13 includes two bridge arms. Correspondingly, each filter circuit 14 includes two filtering inductors L. The three-phase three-level converter 1c of FIG. 9 has the similar structure with the three-phase two-level converter 1b of FIG. 8, and the only difference therebetween is the detailed structure of the bridge arm circuit 13. Based on the same principle, the three-phase converter with multi-way (more than two-way) interleaving can be implemented, and the detailed descriptions thereof are omitted herein.

In summary, the present disclosure provides a three-phase converter and a control method thereof. The bridge arm circuit of the three-phase converter is controlled to selectively work in the clamping state, the DCM mode or the TCM mode. Accordingly, each bridge arm circuit can achieve zero-voltage switching or valley switching. Meanwhile, the switching frequency is limited to be lower than a preset frequency so as to reduce the switching loss and improving the efficiency of the converter. In addition, since the filtering capacitor midpoint is connected to the DC capacitor midpoint, the controls for the circuits of three phases respectively are decoupled from each other, which is beneficial for circuit analysis and design. Meanwhile, an internal circuit loop for common mode component is provided to reduce the pressure on the EMI filter.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A three-phase converter, comprising:
    an AC terminal electrically coupled to an AC source;
    a DC terminal electrically coupled to a DC source or a DC load;
    three bridge arm circuits forming a three-phase bridge arm circuit collaboratively and electrically connected to the DC terminal, wherein each of the three bridge arm circuits has a bridge arm midpoint;
    three filter circuits forming a three-phase filter circuit collaboratively, wherein the three-phase filter circuit is electrically connected between the three-phase bridge arm circuit and the AC terminal, the three filter circuits are electrically connected to the bridge arm midpoints of the three bridge arm circuits respectively, each of the three filter circuits comprises a filtering inductor and a filtering capacitor, the filtering inductor is electrically connected between the AC terminal and the corresponding bridge arm midpoint, a first terminal of the filtering capacitor is electrically connected between the AC terminal and the corresponding filtering inductor, and three second terminals of the three filtering capacitors are electrically connected with each other to form a filtering capacitor midpoint;
    a capacitor module electrically connected to two terminals of the three-phase bridge arm circuit in parallel and comprising two capacitors and a DC capacitor midpoint, wherein the DC capacitor midpoint is located between the two capacitors and is electrically coupled to the filtering capacitor midpoint; and
    a controller is used to control each of the three bridge arm circuits to work at least in a first mode and a second mode at different time in a single line voltage cycle of the AC source, wherein in the first mode, the bridge arm circuit works in a clamping state, wherein in the second mode, the bridge arm circuit selectively works in a DCM mode or a TCM mode, so that a switching frequency of the three-phase converter is limited to be lower than a preset frequency;
    wherein when the three-phase converter works with over 80% of a rated load, a time length of the bridge arm circuit working in the second mode is ⅓~⅔ of the line voltage cycle.

2. The three-phase converter according to claim 1, wherein the three-phase converter adopts a DPWM scheme, the controller is used to superpose a three-phase initial modulation wave of the three-phase bridge arm circuit on a three-phase common mode modulation wave to generate a three-phase modulation wave, and there is no vertical jump in a waveform of the three-phase common mode modulation wave.

3. The three-phase converter according to claim 2, wherein the clamping state comprises a positive clamping state and a negative clamping state, the bridge arm circuit works in the positive clamping state when the corresponding modulation wave reaches a positive limit value, and the bridge arm circuit works in the negative clamping state when the corresponding modulation wave reaches a negative limit value.

4. The three-phase converter according to claim 1, wherein each of the three bridge arm circuits comprises a main transistor and an auxiliary transistor electrically connected in series, the main transistor and the auxiliary transistor are not in an on state at the same time, and each of the three bridge arm circuits comprises a main capacitor and an auxiliary capacitor electrically connected to the main transistor and the auxiliary transistor respectively.

5. The three-phase converter according to claim 4, wherein when a sum of a time length of the main transistor being in the on state and a time length of the auxiliary transistor being in the on state is greater than or equal to a preset period corresponding to the preset frequency, the corresponding bridge arm circuit works in the DCM mode or the TCM mode, wherein when the sum of the time length of the main transistor being in the on state and the time length of the auxiliary transistor being in the on state is less than the preset period corresponding to the preset frequency, the corresponding bridge arm circuit works in the DCM mode.

6. The three-phase converter according to claim 4, wherein in each of the three bridge arm circuits, when the bridge arm circuit works in the TCM mode, an inductor current on the filtering inductor of the corresponding filter circuit increases when the main transistor is in the on state, the inductor current decreases when the auxiliary transistor is in the on state, the auxiliary transistor is turned off when the inductor current decreases to a negative preset current value, the main capacitor is discharged by the inductor current, which is negative, and a voltage on the main capacitor decreases, then the main transistor is turned on when the voltage on the main capacitor decreases to a preset voltage.

7. The three-phase converter according to claim 4, wherein the DCM mode comprises at least one of a first DCM mode, a second DCM mode and a third DCM mode, in each of the three bridge arm circuits and the corresponding filter circuit, the bridge arm circuit works in the first DCM mode or the third DCM mode when a product of a filtering voltage on the filtering capacitor and an average value of an inductor current on the filtering inductor is positive, and the bridge arm circuit works in the second DCM mode when the product of the filtering voltage and the average value of the inductor current is negative.

8. The three-phase converter according to claim 7, wherein in each of the three bridge arm circuits and the corresponding filter circuit, when the bridge arm circuit works in the first DCM mode, the inductor current increases when the main transistor is in the on state, the inductor current decreases when the auxiliary transistor is in the on state, the auxiliary transistor is turned off when the inductor current decreases to zero, and then the filtering inductor, the main capacitor and the auxiliary capacitor resonates with each other when the main transistor and the auxiliary transistor are both in an off state, the main transistor is turned on when a voltage on the main capacitor resonates to the n-th valley value, and n is a positive integer.

9. The three-phase converter according to claim 8, wherein the value of n is determined by the preset frequency.

10. The three-phase converter according to claim 7, wherein in each of the three bridge arm circuits and the corresponding filter circuit, when the bridge arm circuit works in the second DCM mode, the inductor current increases when the main transistor is in the on state, the inductor current decreases when the auxiliary transistor is in the on state, the auxiliary transistor is turned off when the inductor current decreases to zero, and then the filtering inductor, the main capacitor and the auxiliary capacitor resonates with each other when the main transistor and the auxiliary transistor are both in an off state, a valley value of a voltage on the main capacitor during resonance equals zero, the main transistor is turned on when the voltage on the main capacitor resonates to the n-th valley value, and n is a positive integer.

11. The three-phase converter according to claim 7, wherein in each of the three bridge arm circuits and the corresponding filter circuit, when the bridge arm circuit works in the third DCM mode, the inductor current increases when the main transistor is in the on state, the inductor current decreases when the auxiliary transistor is in the on state, the auxiliary transistor is turned off when the inductor current decreases to zero, and then the filtering inductor, the main capacitor and the auxiliary capacitor resonates with each other when the main transistor and the auxiliary transistor are both in an off state, the auxiliary transistor is turned on for a preset time when a voltage on the main capacitor resonates to the m-th peak value so that the inductor current decreases to a negative preset current value, the main capacitor is discharged by the inductor current, which is negative, and the voltage on the main capacitor decreases, and the main transistor is turned on when the voltage on the main capacitor decreases to a preset voltage, and m is a positive integer.

12. The three-phase converter according to claim 7, wherein when an absolute value of the average value of the inductor current is smaller than a preset threshold, the preset frequency is decreased correspondingly.

13. The three-phase converter according to claim 1, wherein in each of the three bridge arm circuits and the corresponding filter circuit, the bridge arm circuit comprises a plurality of bridge arms electrically connected in parallel, each of the plurality of bridge arms has one bridge arm midpoint, the filter circuit comprises a plurality of filtering inductors corresponding to the plurality of bridge arms one-to-one, and each of the plurality of filtering inductors is electrically connected between the AC terminal and the bridge arm midpoint of the corresponding bridge arm.

14. The three-phase converter according to claim 1, wherein the time length of the bridge arm circuit working in the second mode is at least 50%, 75%, 80% or 90% of ⅔ of the line voltage cycle.

15. A control method configured to control a three-phase converter, wherein the three-phase converter comprises an AC terminal, a DC terminal, three bridge arm circuits, three filter circuits and a capacitor module, the AC terminal is electrically coupled to an AC source, the DC terminal is electrically coupled to a DC source and a DC load, the three bridge arm circuits are electrically connected to the DC terminal and form a three-phase bridge arm circuit collaboratively, each of the three bridge arm circuits has a bridge arm midpoint, the three filter circuits collaboratively form a three-phase filter circuit electrically connected between the three-phase bridge arm circuit and the AC terminal, the three filter circuits are electrically connected to the bridge arm midpoints of the three bridge arm circuits respectively, each of the three filter circuits comprises a filtering inductor and a filtering capacitor, the filtering inductor is electrically connected between the AC terminal and the corresponding bridge arm midpoint, a first terminal of the filtering capacitor is electrically connected between the AC terminal and the corresponding filtering inductor, and three second terminals of the filtering capacitors of the three filter circuits are electrically connected with each other to form a filtering capacitor midpoint, the capacitor module is electrically connected to two terminals of the three-phase bridge arm circuit in parallel and comprises two capacitors and a DC capacitor midpoint, the DC capacitor midpoint is located between the two capacitors and is electrically coupled to the filtering capacitor midpoint, and the control method comprises:

controlling each of the three bridge arm circuits to work at least in a first mode and a second mode at different time in a single line voltage cycle of the AC source, wherein in the first mode, the bridge arm circuit is controlled to work in a clamping state, wherein in the second mode, the bridge arm circuit is controlled to selectively work in a DCM mode or a TCM mode, and a switching frequency of the three-phase converter is limited to be lower than a preset frequency, wherein when the three-phase converter works with over 80% of a rated load, a time length of the bridge arm circuit working in the second mode is ⅓~⅔ of the line voltage cycle.

16. The control method according to claim 15, wherein the three-phase converter adopts a DPWM scheme, the control method further comprises a step of superposing a three-phase initial modulation wave of the three-phase bridge arm circuit on a three-phase common mode modulation wave to generate a three-phase modulation wave corresponding to the three-phase bridge arm circuit, and there is no vertical jump in a waveform of the three-phase common mode modulation wave.

17. The control method according to claim 16, wherein the clamping state comprises a positive clamping state and a negative clamping state, the bridge arm circuit works in the positive clamping state when the corresponding modulation wave reaches a positive limit value, and the bridge arm circuit works in the negative clamping state when the corresponding modulation wave reaches a negative limit value.

18. The control method according to claim 15, wherein each of the three bridge arm circuits comprises a main transistor and an auxiliary transistor electrically connected in series, the main transistor and the auxiliary transistor are not in an on state at the same time, and each of the three bridge arm circuits comprises a main capacitor and an auxiliary capacitor electrically connected the main transistor and the auxiliary transistor respectively.

19. The control method according to claim 18, wherein when a sum of a time length of the main transistor being in the on state and a time length of the auxiliary transistor being in the on state is greater than or equal to a preset period corresponding to the preset frequency, the corresponding bridge arm circuit works in the DCM mode or the TCM mode, wherein when the sum of the time length of the main transistor being in the on state and the time length of the auxiliary transistor being in the on state is less than the preset period corresponding to the preset frequency, the corresponding bridge arm circuit works in the DCM mode.

20. The control method according to claim 15, wherein the time length of the bridge arm circuit working in the second mode is at least 50%, 75%, 80% or 90% of ⅔ of the line voltage cycle.

* * * * *